United States Patent
Honaker

(10) Patent No.: US 12,514,844 B1
(45) Date of Patent: Jan. 6, 2026

(54) CANNABINOID COMPOSITIONS AND DOSAGE FORMS

(71) Applicant: Lock Box LLC, Pueblo, CO (US)

(72) Inventor: Shawn Paul Honaker, Pueblo, CO (US)

(73) Assignee: Lock Box LLC, Pueblo, CO (US)

( * ) Notice: Subject to any disclaimer, the term of this patent is extended or adjusted under 35 U.S.C. 154(b) by 11 days.

(21) Appl. No.: 17/222,276

(22) Filed: Apr. 5, 2021

(51) Int. Cl.
| | |
|---|---|
| *A61K 31/352* | (2006.01) |
| *A23L 29/00* | (2016.01) |
| *A23L 29/231* | (2016.01) |
| *A23L 29/238* | (2016.01) |
| *A23L 29/256* | (2016.01) |
| *A23L 29/281* | (2016.01) |
| *A23L 29/30* | (2016.01) |
| *A23L 33/105* | (2016.01) |
| *A23L 33/115* | (2016.01) |
| *A23L 33/125* | (2016.01) |
| *A23P 20/10* | (2016.01) |
| *A23P 30/10* | (2016.01) |
| *A61K 9/00* | (2006.01) |
| *A61K 31/05* | (2006.01) |

(52) U.S. Cl.
CPC .......... *A61K 31/352* (2013.01); *A23L 29/035* (2016.08); *A23L 29/231* (2016.08); *A23L 29/238* (2016.08); *A23L 29/256* (2016.08); *A23L 29/284* (2016.08); *A23L 29/30* (2016.08); *A23L 33/105* (2016.08); *A23L 33/115* (2016.08); *A23L 33/125* (2016.08); *A23P 20/11* (2016.08); *A23P 30/10* (2016.08); *A61K 9/0056* (2013.01); *A61K 31/05* (2013.01); *A23V 2002/00* (2013.01)

(58) Field of Classification Search
None
See application file for complete search history.

(56) References Cited

U.S. PATENT DOCUMENTS

2016/0296470 A1* 10/2016 Romanoschi ...... A61K 31/4545
2018/0077948 A1* 3/2018 Gudjonson .......... A23G 3/0004
2019/0254342 A1* 8/2019 Ademe .................... A24C 5/00

FOREIGN PATENT DOCUMENTS

WO    WO 2018/237000    * 12/2018    ........... A61K 31/506

OTHER PUBLICATIONS

White ("Is Corn Syrup Bad for You?", available online at https://www.foodnetwork.com/healthyeats/healthy-tips/2019/02/what-s-the-deal-with-corn-syrup-, 2022) (Year: 2022).*

* cited by examiner

*Primary Examiner* — Craig D Ricci
(74) *Attorney, Agent, or Firm* — Craig R. Miles; CR MILES P.C.

(57) ABSTRACT

Generally, a composition and methods of making a composition and an edible article from the composition. Specifically, a composition containing a botanical drug substance and methods of making and using an edible article from the composition for delivery of a dose of the botanical drug substance.

9 Claims, 1 Drawing Sheet

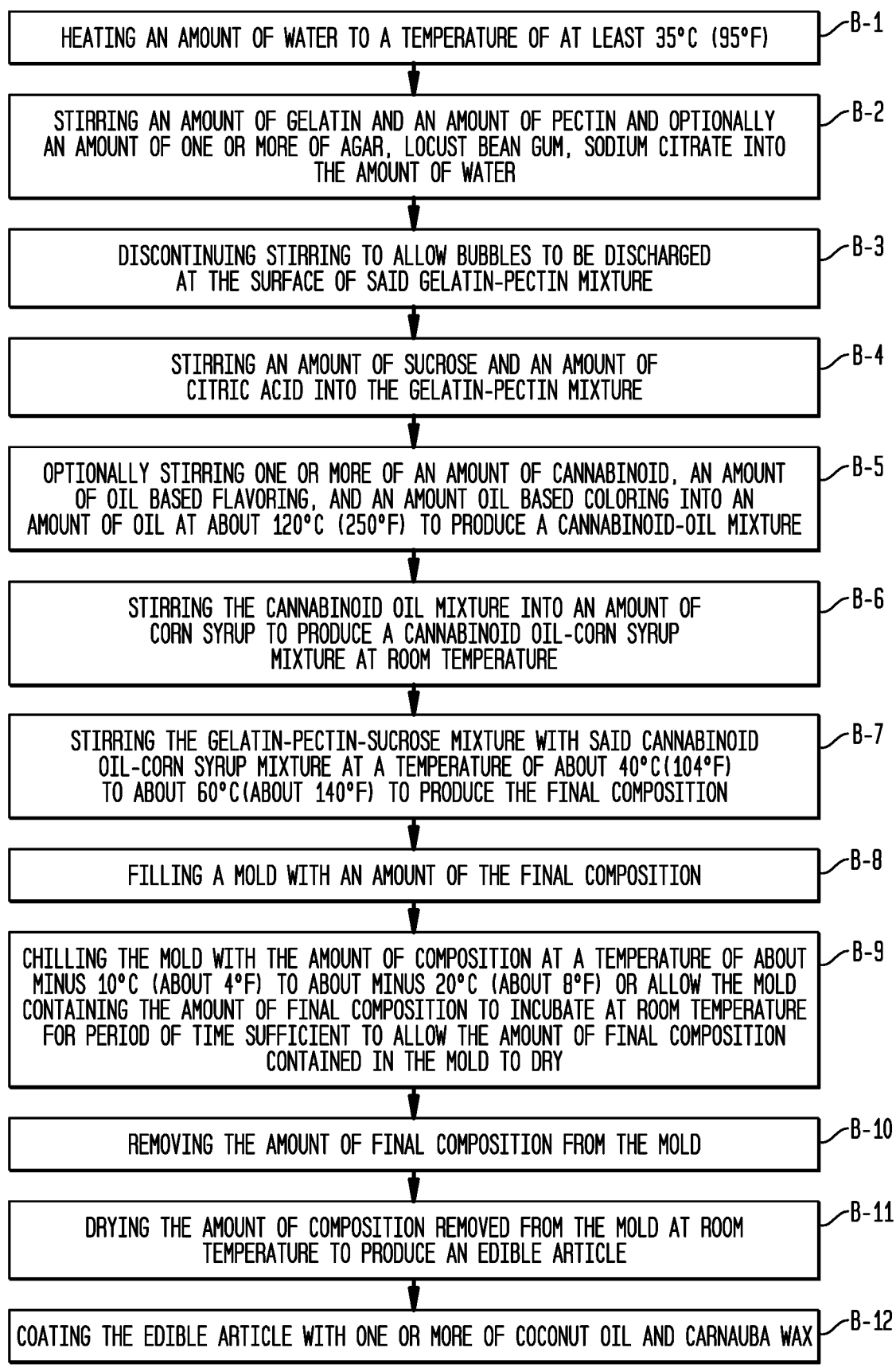

US 12,514,844 B1

CANNABINOID COMPOSITIONS AND DOSAGE FORMS

I. FIELD OF THE INVENTION

Generally, a composition and methods of making a composition and an edible article from the composition. Specifically, a composition containing a botanical drug substance and methods of making and using an edible article from the composition for delivery of a dose of the botanical drug substance.

II. BACKGROUND OF THE INVENTION

With the legalization of *Cannabis* in several states and the emerging promise of extracts from various species of *Cannabis* as natural pharmaceutical active agents, methods of delivery of the *Cannabis* extracts are of interest. Cannabinoid extracts derived from species of *Cannabis* have been shown to be effective treatments for glaucoma, epilepsy, Dravet's syndrome, cancer, anxiety, Alzheimer's, muscle spasms, pain from multiple sclerosis, inflammatory bowel disease, pain from arthritis, lupus, Parkinson's disease, post-traumatic stress disorder, pain and nausea accompanying chemotherapy, anorexia, and drug dependency and withdrawal. Currently, cannabinoids are often ingested as a component of syrups, tablets, and films, whether as solids or liquids, or by inhalation of smoke from burning the leaves of or extracts obtained from the *Cannabis* plant.

Each of these methods of delivery can have certain limitations or drawbacks. Certain individuals with phagophobia, a fear of swallowing, pnigophobia, a fear of choking, and dysphagia, difficulty swallowing may not swallow solids or liquid dosage forms. Inhalation of the smoke can irritate the lungs, leading to adverse health effects. Ingestion can reduce efficacy due to malabsorption across the gastrointestinal tract, the first-pass effect of the liver, or molecular modifications occurring during these processes. These limitations may be reduced or inapplicable to dosage delivery forms which can be chewed or bioerode in the oral cavity and then ingested which can be an effective method for delivering cannabinoids.

Therefore, there would be an advantage in a composition which can entrain a cannabinoid while remaining moldable for production of an edible article which chewed or otherwise degraded in the oral cavity to effectively deliver entrained cannabinoids buccally or sublingually as well as by ingestion to increase bioavailability of the pharmaceutically active agent.

III. SUMMARY OF THE INVENTION

Accordingly, broad object of the invention can be to provide one or more embodiments of a composition into which a botanical drug substance may be introduced and may thereafter be molded or formed into an edible article which can bioerode upon oral administration to buccally, sublingually, or by systemic absorption at any point along the gastrointestinal tract, deliver a dose of the botanical drug substance, such as a cannabinoid, to the blood stream.

Another broad object of the invention can be to provide a composition and a method of making a composition including one or more of: an amount of water, an amount of gelatin, an amount of pectin, an amount of locust bean gum, an amount of agar, an amount of sodium citrate, an amount of sucrose, an amount of citric acid, an amount of corn syrup, an amount of flavoring, an amount of terpene, an amount of oil, and an amount of botanical drug substance, wherein the composition may be formed or molded into an edible article having a gummy texture.

Another broad object of the invention can be to provide a method of using an edible article made from a composition including one or more of: an amount of water, an amount of gelatin, an amount of pectin, an amount of locust bean gum, an amount of agar, an amount of sodium citrate, an amount of sucrose, an amount of citric acid, an amount of corn syrup, an amount of flavoring, an amount of terpene, an amount of oil, and an amount of botanical drug substance for oral administration of a dose of the botanical drug substance.

Naturally, further objects of the invention are disclosed throughout other areas of the specification, drawings, photographs, and claims.

IV. BRIEF DESCRIPTION OF THE DRAWINGS

FIG. 1 is a block diagram of a particular method of making one or more of: a composition, a dosage deliver composition, and making an edible article from the composition or dosage delivery composition.

V. DETAILED DESCRIPTION OF THE INVENTION

Generally, a composition and methods of making and using an edible article from the composition. In particular embodiments, a dosage delivery composition containing a botanical drug substance and methods of making and using an edible article from the dosage delivery composition for oral administration (also referred to as "peroral delivery") of a dose of the botanical drug substance.

"A" or "an" entity means one or more of that entity; for example, "a polymer" refers to one or more polymers or at least one polymer. As such, the terms "a" or "an", "one or more" and "at least one" can be used interchangeably herein. Furthermore, the language "selected from the group consisting of" refers to one or more of the elements in the list that follows, including combinations of two or more of the elements.

"About" means that ranges may be expressed as from "about" one particular value to "about" another particular value. When such a range is expressed, another embodiment includes from the one particular value to the other particular value. Similarly, when values are expressed as approximations, by use of the antecedent "about," it will be understood that the particular value forms another embodiment. In the context of such a numerical value or range "about" means plus or minus 10% of the numerical value or range recited or claimed unless otherwise specified, or the values within the range are incrementally divided into lesser percentage between ranges or values.

"Bioerodible" for purposes of this invention means the ability of a material to break down within the physiological environment of the mouth or remaining digestive tract by one or more physical, chemical, or cellular processes.

"Botanical drug substances" for the purposes of this invention means an extract which fulfils the definition of a "botanical drug substance" provided in the *Guidance for Industry Botanical Drug Products*, June 2004, US Department of Health and Human Services, Food and Drug Administration Centre for Drug Evaluation and Research of: "A drug substance derived from one or more plants, algae, or macroscopic fungi. It is prepared from botanical raw materials by one or more of the following processes: pulverization, decoction, expression, aqueous extraction, ethanolic extraction, or other similar processes," such as hydrocarbon extraction using propane or butane, and without limitation to the breadth of the foregoing, a drug substance derived from *Cannabis*.

"*Cannabis*" for the purposes of this invention means the genus *Cannabis* including one or more of *Cannabis sativa*, *Cannabis indica*, *Cannabis ruderalis*, and *Cannabis afghanica*.

"Cannabinoid" for the purposes of this invention means a class of chemical compounds extracted from *Cannabis*, and without limitation to the breadth of the foregoing, chemical compounds that act on cannabinoid receptors on cells that repress neurotransmitter release in the brain, the cannabinoid receptors including the endocannabinoids, phytocannabinoids, synthetic cannabinoids, and cannabidiol, or combinations thereof.

"Cannabinoid Full Spectrum" for the purposes of this invention means a heterogenous extract of cannabinoids from *Cannabis* including tetrahydrocannabinol.

"Cannabinoid Broad Spectrum" for the purposes of this invention means a heterogenous extract of cannabinoids from *Cannabis* substantially excluding (less than 0.3% tetrahydrocannabinol) or excluding tetrahydrocannabinol.

"Cannabinoid Distillate" for the purposes of this invention means a distillation fraction containing a subset of cannabinoids contained in Cannabinoid Full Spectrum or Cannabinoid Broad Spectrum.

"Cannabinoid Isolate" for the purposes of this invention means a substantially molecularly homogenous extract of a cannabinoid, and without limitation to the breadth of the foregoing, includes a substantially molecularly homogenous extract of: cannabinol, cannabinolic acid, $\Delta(10)$-tetrahydrocannabinol, $\Delta(10)$-tetrahydrocannabinolic acid, $\Delta(10)$-cannabidiol, $\Delta(10)$-tetrahydrocannabidiolic acid, $\Delta(9)$-tetrahydrocannabinol, $\Delta(9)$-tetrahydrocannabinolic acid, $\Delta(9)$-cannabidiol, $\Delta(9)$-tetrahydrocannabidiolic acid, $\Delta(8)$-tetrahydrocannabinol, $\Delta(8)$-tetrahydrocannabinolic acid, $\Delta(8)$-tetrahydrobannabidiol, $\Delta(8)$-tetrahydrocannacbidiolic acid, $\Delta(9)$-tetrahydrocannabivarin, cannabigerol, cannabidigerolic acid, cannabichromene, cannabichromenic acid, cannabicyclol, cannabicyclolic acid, cannabielsoin, cannabitriol, nabilone.

"Cannabinoid Carrier" for the purposes of this invention means any substrate used in the process of cannabinoid delivery to improve the selectivity, effectiveness, or safety of cannabinoid administration, and without limitation to the breadth of the foregoing, including polyvinylpyrrolidone, soybean oil, coconut oil, sesame oil, argan oil, oleic acid, oleoyl polyxyl-6 glycerides, PEG hydrogenated castor oil, carnauba leaf wax, phospholipids, phosphatidylcholine, phosphatidylserine, phosphatidic acid, liposomes, micelles, dendrimers, solid nanoparticles of biodegradable polymers, curcumin, resveratrol, piperine, chitosan, poly(lactic-co-glycolic acid), poly-ε-caprolactone, carbon nanotubes, CB-CD complexes, and CTC complexes, and combinations thereof.

"Combination or combining" for the purposes of this invention means any method of putting two or more materials together. Such methods include, but are not limited to, mixing, blending, commingling, concocting, homogenizing, incorporating, intermingling, fusing, joining, shuffling, stirring, coalescing, integrating, confounding, joining, uniting, or the like.

"Complex" for the purposes of this invention means a molecular entity formed by chemical association involving two or more component molecular entities.

"Composition" for the purposes of this invention means a composition which may be formable or moldable into edible article and which may or may not contain a botanical drug substance, cannabinoid full spectrum, cannabinoid broad spectrum, cannabinoid distillate, or cannabinoid isolate, and without limitation to the breadth of the foregoing, a composition which may be formable or moldable by manufacturing processes using a depositing machine or manual deposition of the composition into molds or spread to produce films or equivalent methods of manufacture.

"Dosage Delivery Composition" for purposes of this invention means a composition which contains a botanical drug substance, cannabinoid full spectrum, cannabinoid broad spectrum, cannabinoid distillate, or cannabinoid isolate, and without limitation to the breadth of the foregoing, a dosage delivery composition formable or moldable into edible article by manufacturing processes using a depositing machine or manual deposition of the composition into molds or spread to produce films or equivalent methods of manufacture.

"Edible article" for the purposes of this invention means an article suitable or safe to eat formed or molded from a composition, or from a dosage delivery composition containing a botanical drug substance, cannabinoid, cannabinoid full spectrum, cannabinoid broad spectrum, or cannabinoid isolate bioerodible upon oral administration to deliver the botanical drug substance by way of the oral cavity or ingestion.

"Equivalent" for the purposes of this invention means a drug or chemical containing similar amounts of the same raw materials as another drug or chemical or having similar chemical structures, properties or functions to another drug or chemical.

"Oral cavity" for the purposes of this invention means the cavity of the mouth.

"Oral Administration" for the purpose of this invention means delivery of a composition or drug delivery composition containing a botanical drug substance via the oral cavity for delivery to the blood stream buccally, sublingually, or systemic absorption at any point along the gastrointestinal tract, and without limitation to the breadth of the forgoing, break down of an edible article in the oral cavity, wherein the edible article produced from a composition or a dosage delivery composition for delivery of a botanical drug substance, a cannabinoid, cannabinoid full spectrum, cannabinoid broad spectrum, cannabinoid distillate, or cannabinoid isolate to the blood stream buccally, sublingually, or systemic absorption at any point along the gastrointestinal tract of a cannabinoid.

"Substantially Homogeneous" for the purposes of this invention means a purity of the isolated substance occurring in a range of 95% to 99.5%.

"Terpene" for the purposes of this invention means a class of hydrocarbon compounds with the formula $(C_5H_8)_n$ or derivative thereof, whether found as a natural product or biosynthesized by oligomerization of isoprene units. A terpene can be acyclic, monocyclic, bicyclic, or multicyclic.

"Taste Mask" for the purposes of this invention means a substance which masks or overcomes the bitter or unpleasant taste of a composition, dosage deliver composition or edible article, and without limitation to the breadth of the foregoing, includes CLEARMASK 805NIP CT05 NATURAL FLAVORS, CLEARMASK 803NMP CT803 NATURAL FLAVORS.

"Weight Percent" for the purposes of this invention means the weight of a specified raw material in the composition or dosage delivery composition to the total weight of the raw materials in the composition or dosage delivery composition.

Embodiments can include a composition which does not contain a botanical drug substance or a dosage delivery composition which contains a botanical drug substance. In particular embodiments, the botanical drug substance can be a cannabinoid, or a cannabinoid associated with a cannabinoid carrier.

The cannabinoid can comprise an amount cannabinoid contained in a botanical drug substance, a cannabinoid full spectrum, a cannabinoid broad spectrum, a cannabinoid distillate, a cannabinoid isolate, and combinations thereof. In particular embodiments, the cannabinoid can be selected from the group including or consisting of: cannabinol, cannabinolic acid, Δ(10)-tetrahydrocannabinol, Δ(10)-tetrahydrocannabinolic acid, Δ(10)-cannabidiol, Δ(10)-tetrahydrocannabidiolic acid, Δ(9)-tetrahydrocannabinol, Δ(9)-tetrahydrocannabinolic acid, Δ(9)-cannabidiol, Δ(9)-tetrahydrocannabidiolic acid, Δ(8)-tetrahydrocannabinol, Δ(8)-tetrahydrocannabinolic acid, Δ(8)-tetrahydrobannabidiol, Δ(8)-tetrahydrocannacbidiolic acid, Δ(9)-tetrahydrocannabivarin, cannabigerol, cannabidigerolic acid, cannabichromene, cannabichromenic acid, cannabicyclol, cannabicyclolic acid, cannabielsoin, cannabitriol, nabilone, and equivalents, or combinations thereof.

The carrier, as an illustrative example, can be cyclodextrin which associates with the cannabinoid as cannabinoid-cyclodextrin complexes ("CB-CD complex"). In particular embodiments, the CB-CD complex can further include or consist of a terpene in a cannabinoid-cyclodextrin-terpene complex ("CTC complex"). As a second illustrative example the carrier can be a surfactant which associates with the cannabinoid as a cannabinoid-terpene surfactant micelle ("cannabinoid micelle"). The CB-CD complex, the CTC complex, or the cannabinoid micelle can be discretely prepared or isolated and thereafter associated with the dosage delivery composition, or as to particular embodiments, can be prepared as combinations of the CB-CD complex, the CTC complex, and the cannabinoid-terpene micelle, and such combination associated with the dosage delivery composition which can, but need not necessarily, be formed or molded into an edible article.

Embodiments of the CTC complex, can include, consist essentially of or consist of a cannabinoid, a cyclodextrin, and a terpene. The CTC complex can be formed by combining an amount of a cannabinoid, an amount of a cyclodextrin, and an amount of one or more terpenes in a solvent. The solvent can, but need not necessarily, be ethanol or water. The CTC complex, upon formation and depending on the solvent(s), can remain in solution or precipitate out from the solution as a solid and be collected by filtering or the solution can be lyophilized to yield the CTC complex as a solid. The cyclodextrin can be selected from the group including or consisting of: hydroxypropyl-β-cyclodextrin, sulfobutylether-β-cyclodextrin, maltosyl-β-cyclodextrin, dimethyl-β-cyclodextrin, trimethyl-β-cyclodextrin, randomly methylated-β-cyclodextrin, equivalents, or combinations thereof. The terpene can be selected from the group including or consisting of: alpha-pinene, beta-pinene, myrcene, limonene, carophyllene, linalool, alpha bisabolol, delta 3 carene, borneol, eucalyptol, terpineol, camphene, nerolidol, terpinolene, valencene, humulene, geraniol, phellandrene, fenchol, phytol, sabinene, camphor, menthol, isoborneol, cedrane, guaiol, isopulegol, geranyl acetate, cymene, pulegon, citral, equivalents, or combinations thereof.

Now referring primarily to Table 1, particular embodiments of the composition can include one or more of: water, gelatin, pectin, sucrose, citric acid, corn syrup, and optionally one or more of: a taste mask, a flavoring and a coloring.

TABLE 1

| Composition. | |
|---|---|
| Raw Material | Percent By Weight (wt %) |
| gelatin | about 7 wt % |
| pectin | about 0.3 wt % |
| sucrose | about 21 wt % |
| citric acid | about 1.6 wt % |
| corn syrup | about 49 wt % |
| taste mask | 0 – about 0.003 wt % (optional) |
| flavoring | 0 – about 0.5 wt % (optional) |
| coloring | 0 – about 0.5 wt % (optional) |
| water | to make 100 wt % |

It is to be understood that a particular weight value or a particular weight percent value for each raw material or the range in a weight value or a weight percent for each raw material in an embodiment of the composition or embodiment of a dosage delivery composition can include the outliers in the normal variation of each particular value necessary to achieve one or more particular functional characteristics of the composition or dosage delivery composition, or can be the variation inherent to the manufacturing process of a particular formulation of the composition or dosage delivery composition. Accordingly, as to each Table, a weight value or weight percent value or weight value range or weight percent value range can describe either a single embodiment of the inventive composition or dosage delivery composition having a formulation that can vary as to any particular raw material between the particular weight values or weight percent values, or can describe two different compositions differentiated by the extremes of the weight values or weight percent values of each raw material each extreme having the normal degree of variation based on manufacturing practices, or a plurality of different compositions or dosage delivery compositions each having a discrete formulation which includes a weight value or weight percent value of each raw material which falls in the range of weight values or weight percent values established by the difference in weight values or weight percent values (with normal variation in weight percent due to the manufacturing process). Additionally, each particular value listed in a Table is not intended to be interpreted solely as an absolute value but is also intended to include in the alternative an embodiment which includes the term "about" for the particular value (for example, 20 weight percent water shall also be interpreted as an alternative embodiment of "about 20 weight percent water"). The term "about" shall be interpreted as above defined.

The term "water" in compositions and drug delivery compositions described herein can be potable water, deionized water, distilled, or water otherwise filtered or purified to the desired purity for food processing including water encompassed by CAS No. 7732-18-5 or equivalents.

The term "gelatin" in compositions and drug delivery compositions described herein can be a food grade gelatin made from partial hydrolysis of animal collagen including gelatin encompassed by CAS No. 9000-70-8 or equivalents.

The term "pectin" in compositions and drug delivery compositions described herein can be a food grade pectin which comprises a high molecular weight polysaccharide including about 65% galacturonic acid, and about 35% other polysaccharides and some little monosaccharides including pectin encompassed by CAS No. 9000-69-5 or equivalents.

The term "sweetener" in compositions and drug delivery compositions described herein can be a food grade sucrose (also known as "sugar"), maltose, dextrose, or glucose or combinations thereof.

The term "sucrose" in compositions and drug delivery compositions described herein can be a food grade sucrose which includes granulated sugar made by crystallizing purified and filtered juice from sugar beets or sugar cane and has a sucrose content of not less than 99 percent including sucrose encompassed by CAS No. 57-50-1 or equivalents.

The term "glucose" or "dextrose or D-glucose" in compositions and drug delivery compositions described herein can be a food grade glucose made from starch by action of heat and acids or enzymes in two predominant forms: hydrate, which contains 9% by weight water and anhydrous which contains less than 0.5% water including glucose encompassed by CAS No. 50-99-7 or equivalents.

The term "maltose" in compositions and drug delivery compositions described herein can be a food grade maltose comprises two glucose molecules bound together including maltose encompassed by CAS No. 6363-53-7 or equivalents.

The term "citric acid" in compositions and drug delivery compositions described herein can be a food grade natural citric acid extracted from fruit or made from black mold, *Aspergillus niger*, which creates citric acid when it feeds on sugar including citric acid encompassed by CAS No. 77-92-9 or equivalents.

The term "corn syrup" in compositions or drug delivery compositions described herein can be a food grade high fructose corn syrup or corn syrup made from the starch of corn and contains varying amounts of maltose and higher oligosaccharides, depending on the grade. Corn syrup encompassed by CAS No. 8029-43-4 or equivalents is distinct from high-fructose corn syrup encompassed by CAS No. 977042-84-4 or equivalents, which is manufactured from corn syrup by converting a large proportion of its glucose into fructose using the enzyme D-xylose isomerase, thus producing a sweeter compound due to higher levels of fructose.

The term "taste mask" in compositions or drug delivery compositions described herein can be food grade raw materials that are approved by regulation of the Food and Drug Administration and Generally Recognized as Safe under Sections 201(s) and 49 of the Federal Food, and Cosmetic Act that can be used to mask the taste of other raw materials in the composition or dosage delivery composition, for example cannabinoids. Without limiting the breadth of the foregoing, as illustrative examples, the taste mask can be the bitter-blocking ingredient adenosine monophosphate, or ingredients associated with trademarks CLEARMASK 805NIP CT05 NATURAL FLAVORS, CLEARMASK 803NMP CT803 NATURAL FLAVORS which can include maltodextrin or natural flavors approved for use by regulation of the Food and Drug Administration or are listed as generally recognized as safe (GRAS) on a reliable published association list.

The term "flavoring" in compositions or drug delivery compositions described herein can be food grade extracts or oils that are approved by regulation of the Food and Drug Administration and Generally Recognized as Safe under Sections 201(s) and 49 of the Federal Food, and Cosmetic Act. As an example, an extract is usually made by steeping an a raw material(s) in an extractant (for example, vanilla beans steeped alcohol) for a period of time, while oils are pressed from the raw material (for example vanilla beans pressed to produce vanilla oil). Without limiting the breadth of the foregoing, as illustrative examples, flavorings can include or consist of menthol flavor, eucalyptus flavor, peppermint flavor, spearmint flavor, mint flavor, raspberry flavor, licorice flavor, orange flavor, lemon flavor, grapefruit flavor, caramel flavor, vanilla flavor, cherry flavor, grape flavor, peach flavor, plum flavor, lime flavor, watermelon flavor, pineapple flavor, blueberry flavor, tobacco flavor, almond flavor, amaretto flavor, anise flavor, apple flavor, apricot flavor, banana cream flavor, black cherry flavor, bavarian cream flavor, black walnut flavor, blackberry flavor, blood orange flavor, bourbon flavor, brandy flavor, bubble gum flavor, butter flavor, butter rum flavor, butterscotch flavor, cake batter flavor, cappuccino flavor, caramel flavor, chai tea flavor, cheesecake flavor, chocolate flavor, chocolate hazelnut flavor, cinnamon flavor, citrus blossom flavor, clove flavor, coffee flavor, cool crbme de menthe flavor, cotton candy flavor, cran-raspberry flavor, cream cheese flavor, eggnog flavor, english toffee flavor, fruit punch flavor, ginger flavor, green apple flavor, guava flavor, horchata flavor, hot chili flavor, irish cream flavor, jalapeno flavor, key lime flavor, lavender flavor, lemonade flavor, maple flavor, marshmallow flavor, melon flavor, nutmeg flavor, peanut butter flavor, pecan flavor, pineapple flavor, pistachio flavor, pralines and cream flavor, pumpkin flavor, root beer flavor, rosemary oil flavor, salt water taffy flavor, sassafras flavor, sparkling wine flavor, tangerine flavor, teaberry flavor, thyme flavor, tropical punch flavor, tutti-frutti flavor, watermelon flavor, and wintergreen flavor, and combinations thereof.

The term "coloring" in compositions and drug delivery compositions described herein can be food grade color additives that are approved by regulation of the Food and Drug Administration and Generally Recognized as Safe under Sections 201(s) and 49 of the Federal Food, and Cosmetic Act and listed under Part 73, Color Additives Approved for Use in Human Food. For example, the carmine color can be extracted from cochineal (natural red 4, C.I. 75470) or can be a pigment obtained from the aluminum complex from carminic acid (E120), and without limitation to the foregoing the term "coloring" encompasses red color, orange color, green color, yellow color, blue color, purple color, brown color, violet color, black color, and combinations thereof.

Now with primary reference to FIG. 1, a method of making the composition of Table 1 allows for the batch size to be scaled up or scaled down multiple times. The following illustrative example affords a batch having a total weight in grams of about 367 grams which can be scaled up multiple times including heating an amount of water (70 grams) to at about 77° C. (about 177° F.) in a steam kettle (or equivalent heating device) (B-1). Stirring an amount of gelatin (25 grams) and an amount of pectin (about 1 gramxoptionally further adding one or more of an amount of agar, an amount locust bean gum, and sodium citrate) into said amount of water in the steam kettle until all solids are submerged and then for about five (5) hours or until bubbles at the surface are very thin (B-2), optionally discontinuing stirring to allow bubbles to be discharged at the surface of said gelatin-pectin mixture to produce a gelatin-pectin mixture (also referred to as the "gel mixture") (B-3). In particular embodiments, the gel mixture can be premade and stored under refrigeration, and which is best used within one week of preparation. Stirring an amount of sweetener (75 grams, sugar in this particular embodiment) and an amount of citric acid (6 grams) into the gel mixture in the steam kettle to produce a homogeneous sweetened gel mixture (B-4). Heating an amount of coconut oil (or other oil) in a separate double boiler (or equivalent device) to a temperature of about at about 120° C. (250° F.) (B-5). Optionally, stirring an oil based flavoring (to desired taste) or an oil based coloring (to desired appearance) into the heated coconut oil for about 10 minutes and reducing heat of the amount of coconut oil (optionally containing the flavoring or the coloring) to a warm temperature of about 20° C. to about 30° C. (about 70° F. to about 85° F.). Stirring the amount of coconut oil (1 gram) (optionally including flavoring or coloring) into an amount of corn syrup (175 grams) in a separate receptacle at room temperature to obtain a homogeneous corn syrup-coconut oil mixture (B-6). Optionally, stirring alcohol-based flavoring or coloring into the homogeneous corn syrup-coconut oil mixture. Admixing the corn syrup-coconut oil mixture (optionally containing flavoring or coloring) into the sweetened gel mixture and stirring for about one hour maintaining the center of the final mixture at a temperature of a between about 40° C. (about 104° F.) to about 77° C. (about 170° F.)(B-7).

Now, with primary reference to Table 2, in particular embodiments the composition can further include an amount of terpene.

TABLE 2

Composition.

| Raw Material | Percent By Weight (wt %) |
|---|---|
| gelatin | about 7 wt % |
| pectin | about 0.3 wt % |
| sucrose | about 21 wt % |
| citric acid | about 1.6 wt % |
| corn syrup | about 49 wt % |
| terpene | about 0.1 wt % – about 2 wt % |
| taste mask | 0 – about 0.003 wt % (optional) |
| flavoring | 0 – about 0.5 wt % (optional) |
| coloring | 0 – about 0.5 wt % (optional) |
| water | to make 100 wt % |

In particular embodiments, the composition including an amount of terpene to bestow pharmaceutical, psychological, flavorful or fragrant properties to the composition. The term "Terpene" in compositions and drug delivery compositions described herein can be food grade dietary raw material (also referred to as an "ingredient") under section 201(ff)(1)(C) of the Federal Food, and Cosmetic Act. As defined in the glossary, terpenes can be derived from plants, algae, fungi, their exudates (secretions, such as sap or resin), and their physical parts". A synthetic copy of a terpene may qualify as a dietary raw material (also referred to as an "ingredient") under section 201(ff)(1)(E). As illustrative examples, the terpene can be selected from the group including or consisting of alpha-pinene, beta-pinene, myrcene, limonene, carophyllene, linalool, alpha bisabolol, delta 3 carene, borneol, eucalyptol, terpineol, camphene, nerolidol, terpinolene, valencene, humulene, geraniol, phellandrene, fenchol, phytol, sabinene, camphor, menthol, isoborneol, cedrane, guaiol, isopulegol, geranyl acetate, cymene, pulegon, citral, and combinations thereof.

Again, with primary reference to FIG. 1, in the method of making the composition, the amount of terpene can be admixed by stirring into the heated coconut oil for about 10 minutes at a temperature of about at about 120° C. (2500° F.)(B-5) with the method of making the composition as above described otherwise substantially unchanged.

Now, with primary reference to Table 3, in particular embodiments the composition can further include an amount of cannabinoid.

TABLE 3

| Raw Material | Percent By Weight (wt %) |
|---|---|
| gelatin | about 7 wt % |
| pectin | about 0.3 wt % |
| sucrose | about 21 wt % |
| citric acid | about 1.6 wt % |
| corn syrup | about 49 wt % |
| coconut oil | about 0.3 wt % |
| terpene | about 0.1 wt % – about 2 wt % (optional) |
| taste mask | 0 – about 0.003 wt % (optional) |
| flavoring | 0 – about 0.5 wt % (optional) |
| coloring | 0 – about 0.5 wt % (optional) |
| cannabinoid | 0.5 mg/g – 20 mg/g of dosage delivery composition |
| water | to make 100 wt % |

In particular embodiments, the composition or drug delivery composition can include an amount of botanical drug substance, and in particular embodiments, an amount of cannabinoid, cannabinoid full spectrum, cannabinoid broad spectrum, cannabinoid distillate, or cannabinoid isolate, as above defined, or combinations thereof. In particular embodiments the cannabinoid can be associated with a cannabinoid carrier, as above described. Typically, in an edible article the amount of cannabinoid may vary between about 10 mg and about 1000 mg. The amount of can cannabinoid whether obtained as cannabinoid full spectrum, cannabinoid broad spectrum, cannabinoid distillate, or cannabinoid isolate. In each case, the concentration and purity of the cannabinoid(s) contained in volume or mass of the extract, distillate or isolate can be determined by analysis and the amount of an extract, distillate or isolate to be admixed with the other raw ingredients can be calculated to afford an amount of cannabinoid(s) in the range of 0.5 mg/g-20 mg/g of the dosage delivery composition.

Again, with primary reference to FIG. 1, the method can further include, stirring an amount of cannabinoid (in particular embodiments, the amount of cannabinoid can occur in a range of about 1.7 mg/g to about 16.95 mg/g of the composition or drug delivery composition) in the amount of coconut oil at about 120° C. (250° F.) for about 10 minutes to produce a cannabinoid-coconut oil mixture (B-5), stirring the cannabinoid-coconut oil mixture into the amount of corn syrup to produce a cannabinoid-coconut oil-corn syrup mixture at room temperature (B-6), and stirring the gel mixture with the cannabinoid-coconut oil-corn syrup mixture at a temperature occurring in a range of about 40° C. (about 104° F.) and 60° C. (about 140° F.) to produce said composition or drug delivery composition (B-7).

Now, with primary reference to Table 4, in particular embodiments the composition or dosage delivery composition can comprise, consist essentially of or consist of an admixture of raw materials each having the weight values shown in Table 4 to produce a batch of the composition or dosage delivery composition having a total weight in grams occurring in the range of about 51,553 grams to about 52,510 grams, which can be proportionately scaled upward or downward based on the total batch weight desired.

TABLE 4

Drug Delivery Composition.

| Raw Material | Weight (g) ± Weight (g) |
|---|---|
| water | about 10,150 ± about 4 |
| gelatin | about 3,625 ± about 4 |
| pectin | about 145 ± about 0.2 |
| sucrose | about 10,875 ± about 4 |

TABLE 4-continued

| Drug Delivery Composition. | |
|---|---|
| Raw Material | Weight (g) ± Weight (g) |
| citric acid | about 870 ± about 2 |
| corn syrup | about 25,375 ± about 5 |
| coconut oil | about 145 ± about 0.2 |
| taste mask | 0 – about 1.75 ± 0.04 (optional) |
| flavoring | 0 – about 261 ± 0.2 (optional) |
| color | 0 – about 2 (optional) |
| cannabinoid | about 106 ± 0.02 – about 1063 ± 0.04 (optional) |

Now, with primary reference to Table 5, in the particular embodiment of the composition or the drug delivery composition of Table 4, the gel mixture can be prepared in advance and refrigerated until use as above described using the raw material weight values set forth in Table 5.

TABLE 5

| Gel Composition. | |
|---|---|
| Raw Material | Weight (g) ± Weight (g) |
| water | about 10,150 ± about 4 |
| gelatin | about 3,625 ± about 4 |
| pectin | about 145 ± about 0.2 |

Now, with primary reference to Table 6, in particular embodiments, the composition or the drug deliver composition can be modified to increase stability during shipping and extend the shelf life of the edible article.

TABLE 6

| Drug Delivery Composition. | |
|---|---|
| Raw Material | Percent By Weight (wt %) |
| gelatin | 4 wt %-8 wt % |
| pectin | 0.25 wt %-1.25 wt % |
| sugar | 15 wt %-25 wt % |
| citric acid | 1 wt %-2 wt % |
| corn syrup | 35 wt %-45 wt % |
| coconut oil | 0.25 wt %-1 wt % |
| agar | 1 wt %-2 wt % |
| locust bean gum | 1 wt %-2 wt % |
| sodium citrate | 0.25 wt %-1 wt % |
| flavoring | 0.25 (optional) |
| cannabinoid | 0.25 wt %-1 wt % (optional) |
| water | to make 100 wt % |

The terms gelatin, pectin, sugar, citric acid, corn syrup, coconut oil, flavoring, cannabinoid, and water are for the purposes of this invention as above described.

The term "agar" for the purposes of this invention means a food grade agar recognized as safe by the United States Food and Drug Administration having CAS No. 9002-18-0.

The term "locust bean gum" for the purposes of this invention means a food grade locust bean gum derived from the carob tree having CAS No. 9000-40-2.

The term "sodium citrate" for the purposes of this invention means a food grade sodium salt of citric acid recognized as safe by the United States Food and Drug Administration having CAS No. 6132-04-3.

The composition or dosage delivery composition can include an amount of cannabinoid, cannabinoid full spectrum, cannabinoid broad spectrum, cannabinoid distillate, or cannabinoid isolate, as above defined, or combinations thereof. In particular embodiments the cannabinoid can be associated with a cannabinoid carrier, as above described. Typically, in an edible article the amount of cannabinoid may vary between about 10 mg and about 1000 mg. The amount of can cannabinoid whether obtained as cannabinoid full spectrum, cannabinoid broad spectrum, cannabinoid distillate, or cannabinoid isolate. In each case, the concentration and purity of the cannabinoid(s) contained in volume or mass of the extract, distillate or isolate can be determined by analysis and the amount of an extract, distillate or isolate to be admixed with the other raw ingredients can be calculated to afford an amount of cannabinoid(s) in the range of 0.5 mg/g-20 mg/g of the dosage delivery composition.

Again, referring primarily to FIG. 1, the method above described for making embodiments of the composition or dosage delivery composition can be modified to make the embodiment of Table 6 by admixing the agar, locust bean extract and sodium citrate with the with gelatin and pectin prior to adding to the water. Additionally, the method can further include coating the cured edible article(s) with a mixture of coconut oil and carnauba wax (block B-12).

As can be easily understood from the foregoing, the basic concepts of the present invention may be embodied in a variety of ways. The invention involves numerous and varied embodiments of a composition which may be used for an edible article and methods for making and using such a composition for an edible article.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "carrier" should be understood to encompass disclosure of the act of "carrying"—whether explicitly discussed or not—and, conversely, were there is a disclosure of the act of "carrying", such a disclosure should be understood to encompass disclosure of a "carrier" and even a "means for carrying". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the compositions, drug delivery compositions, or edible articles herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A homogenous gummy composition, comprising:
    an amount of corn syrup of 35 wt % to 45 wt %;
    an amount of sugar of 15 wt % to 25 wt %;
    an amount of gelatin of 4 wt % to 8 wt %;
    an amount of agar of 1 wt % to 2 wt %;
    an amount of locust bean gum of 1 wt % to 2 wt %;
    an amount of citric acid of 1 wt % to 2 wt %;
    an amount of flavoring 0.5 wt % to 2 wt %;
    an amount of pectin of 0.25 wt % to 1.25 wt %;
    an amount of sodium citrate of 0.25 wt % to 1 wt %;
    an amount of coconut oil of 0.25 wt % to 1 wt %;
    an amount of cannabinoid 0.25 wt % to 1 wt %; and
    an amount of water to make 100 wt %.

2. The composition of claim 1, wherein said amount of corn syrup comprises high fructose corn syrup or corn syrup and combinations thereof.

3. The composition of claim 1, wherein said amount of sugar comprises cane sugar.

4. The composition of claim 1, wherein said flavoring is selected from the group consisting of menthol flavor, eucalyptus flavor, peppermint flavor, spearmint flavor, mint flavor, raspberry flavor, licorice flavor, orange flavor, lemon flavor, grapefruit flavor, caramel flavor, vanilla flavor, cherry flavor, grape flavor, peach flavor, plum flavor, lime flavor, watermelon flavor, pineapple flavor, blueberry flavor, tobacco flavor, almond flavor, amaretto flavor, anise flavor, apple flavor, apricot flavor, banana cream flavor, black cherry flavor, bavarian cream flavor, black walnut flavor, blackberry flavor, blood orange flavor, bourbon flavor, brandy flavor, bubble gum flavor, butter flavor, butter rum flavor, butterscotch flavor, cake batter flavor, cappuccino flavor, caramel flavor, chai tea flavor, cheesecake flavor, chocolate flavor, chocolate hazelnut flavor, cinnamon flavor, citrus blossom flavor, clove flavor, coffee flavor, cool creme de menthe flavor, cotton candy flavor, cran-raspberry flavor, cream cheese flavor, eggnog flavor, english toffee flavor, fruit punch flavor, ginger flavor, green apple flavor, guava flavor, horchata flavor, hot chili flavor, irish cream flavor, jalapeno flavor, key lime flavor, lavender flavor, lemonade flavor, maple flavor, marshmallow flavor, melon flavor, nutmeg flavor, peanut butter flavor, pecan flavor, pineapple flavor, pistachio flavor, pralines and cream flavor, pumpkin flavor, root beer flavor, rosemary oil flavor, salt water taffy flavor, sassafras flavor, sparkling wine flavor, tangerine flavor, teaberry flavor, thyme flavor, tropical punch flavor, tutti-frutti flavor, watermelon flavor, and wintergreen flavor, and combinations thereof.

5. The composition of claim 1, further comprising an amount of terpene 0.1 wt % to 2 wt %.

6. The composition of claim 5, wherein said terpene is selected from the group consisting of: alpha-pinene, beta-pinene, myrcene, limonene, carophyllene, linalool, alpha bisabolol, delta 3 carene, borneol, eucalyptol, terpineol, camphene, nerolidol, terpinolene, valencene, humulene, geraniol, phellandrene, fenchol, phytol, sabinene, camphor, menthol, isoborneol, cedrane, guaiol, isopulegol, geranyl acetate, cymene, pulegon, citral, and combinations thereof.

7. The composition of claim 1, wherein said cannabinoid selected from the group consisting of: cannabinol, cannabinolic acid, $\Delta(10)$-tetrahydrocannabinol, $\Delta(10)$-tetrahydrocannabinolic acid, $\Delta(10)$-cannabidiol, $\Delta(10)$-tetrahydrocannabidiolic acid, $\Delta(9)$-tetrahydrocannabinol, $\Delta(9)$-tetrahydrocannabinolic acid, $\Delta(9)$-cannabidiol, $\Delta(9)$-tetrahydrocannabidiolic acid, $\Delta(8)$-tetrahydrocannabinol, $\Delta(8)$-tetrahydrocannabinolic acid, $\Delta(8)$-tetrahydrobannabidiol, $\Delta(8)$-tetrahydrocannacbidiolic acid, $\Delta(9)$-tetrahydrocannabivarin, cannabigerol, cannabidigerolic acid, cannabichromene, cannabichromenic acid, cannabicyclol, cannabicyclolic acid, cannabielsoin, cannabitriol, nabilone, and combinations thereof.

8. The composition of claim 1, wherein said cannabinoid comprises $\Delta(9)$-tetrahydrocannabinol.

9. The composition of claim 1, where said cannabinoid comprises cannabidiol.

* * * * *